June 27, 1967     P. SCHWERIN     3,328,803
AUDIENCE REACTION MEASURING APPARATUS
Filed Feb. 15, 1965
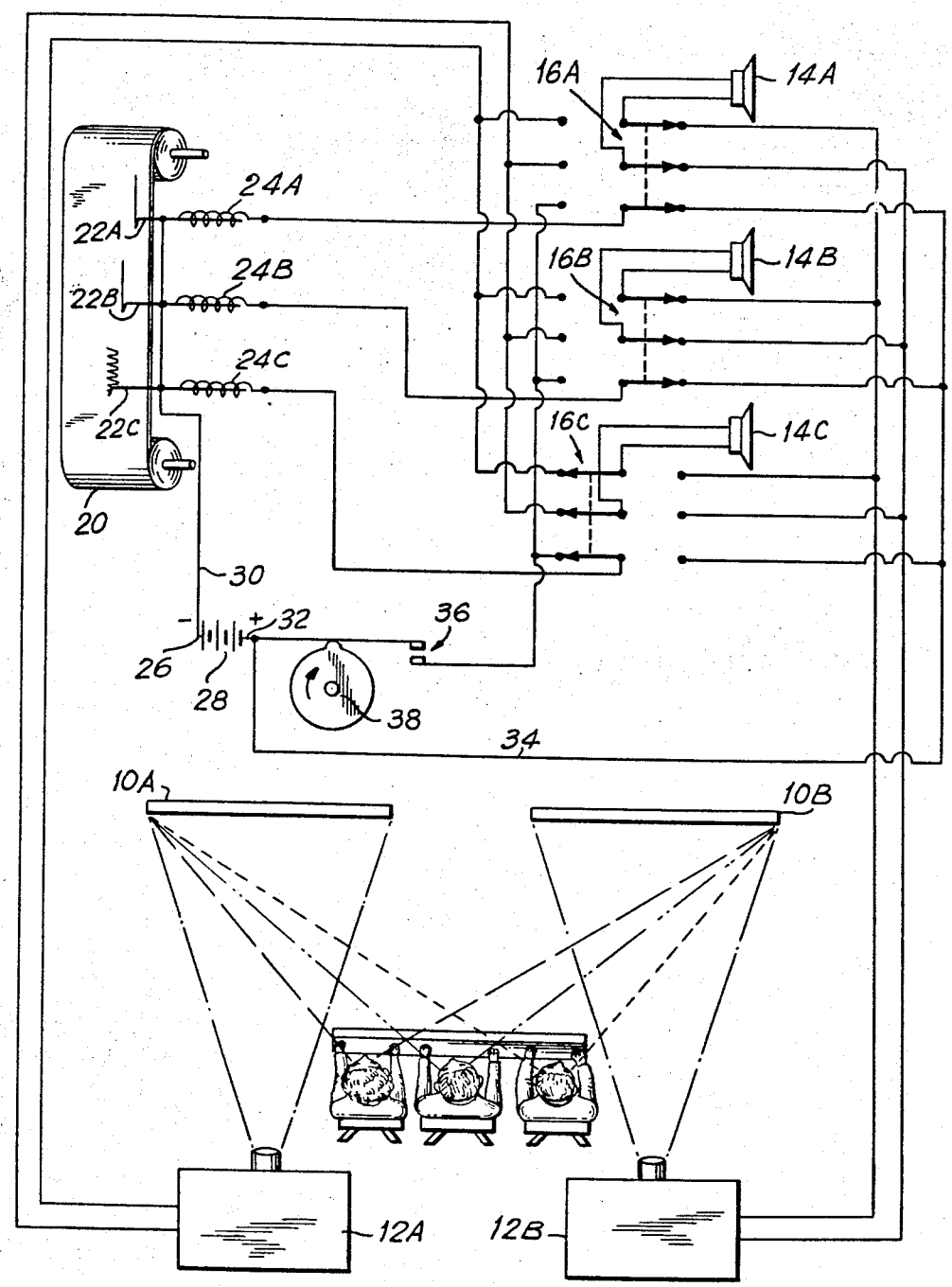
INVENTOR
PAUL SCHWERIN
BY
ATTORNEY 3,328,803
AUDIENCE REACTION MEASURING APPARATUS
Paul Schwerin, Dumont, N.J., assignor to Schwerin Research Corporation, New York, N.Y., a corporation of New York
Filed Feb. 15, 1965, Ser. No. 432,630
8 Claims. (Cl. 346—49)

ABSTRACT OF THE DISCLOSURE

An audience reaction measuring system simultaneously presenting a plurality of independent visual displays within view of each of a plurality of individuals in an audience, each of the visual displays having an audio display associated respectively therewith, each of said audio displays being alternatively selectable independently by each individual, and having recording means for independently recording the instant by instant selection of each such individual.

---

This invention relates to a method and apparatus for measuring the reaction of the individual members of an audience to a plurality of visual displays, each visual display having an audio display associated respectively therewith.

In the preparation of visual displays such as cinematic or television presentations, it is advantageous to know how a plurality of individuals appreciate such presentations on an instant to instant basis, and particularly whether they prefer one presentation to another one.

It is, therefore, an object of this invention to provide a method and an apparatus for measuring the instant to instant response of each of a plurality of individuals to a plurality of simultaneously available visual displays.

It is another object of this invention to provide a method and an apparatus for measuring and recording the instant to instant response of each of a plurality of individuals to a plurality of visual displays which are simultaneously available to the viewer and continuously competing for his attention.

A feature of this invention is the simultaneous presentation of a plurality of independent visual displays within the view of each of a plurality of individuals in an audience, each of the visual displays having an audio display respectively associated therewith, each of said audio displays being alternatively selectable independently by each individual, and recording means for independently recording the instant by instant selection of each individual.

These and other objects, features and advantages will be apparent from the following detailed description taken in conjunction with the accompanying drawing in which:

The figure is a diagram of an embodiment of this invention.

The figure illustrates an embodiment of this invention for an audience consisting of three individuals, each of whom is presented with two visual displays, each visual display having a respective audio display. The invention encompasses the expansion to any number of individuals and/or visual displays.

Each individual in the audience is disposed so that he may conveniently view any one of a plurality of screens 10A and 10B. Each of the screens has associated therewith a respective projector 12A and 12B, for projecting an image thereon and for providing an audio output associated with such image. Each projector thus provides a correlated visual and an audio output signal. Each of the visual displays is spaced from the others so that it may be conveniently viewed by each viewer. However, the other visual displays are close enough to the one being viewed so that they are within the peripheral field of view of each viewer, and each viewer will be marginal aware of the subject matter of the visual displays which he is not at that instant concentrating.

Each individual has an audio transducer 14A, 14 and 14C, respectively, such as an earphone, and a switc 16A, 16B, and 16C, respectively by which he can coup his earphone to any one of the plurality of audio signa from the projectors 12A and 12B, respectively. Eac viewer will normally have his switch 16 positioned to pr vide him with the audio display associated with the visu display that he is at that instant watching.

In view of the fact that all of the visual displays a simultaneously within the field of view of each viewe the viewer is easily distracted from one visual display the other, as one or the other visual display at any i stant appears to be more interesting. If the distraction more than fleeting, the viewer will normally repositic his switch 16 to provide himself with the audio displ associated with the more interesting visual display.

A recording system 18 is associated with the switch 16A, 16B and 16C to continuously record the positic of such switches, and thereby, the audio display whic is presently of greatest interest to each viewer. The recor ing system comprises a chart roll 20 which is advance at a constant speed by a suitable drive means, not show such as a constant speed motor driving a sprocket whe which engages sprocket holes in the chart roll. The a vance of the chart roll is synchronized with the advan of the visual displays, and may have indicia indicatii the elapsed time preprinted thereon. A plurality of r cording pens 22A, 22B and 22C are disposed for tra ing upon the chart roll. Each pin is coupled to an ele tromagnet 24A, 24B and 24C, respectively, for lateral d flection thereby. One terminal 26 of a battery 28 is co pled via a conductor 30 to one end of each of the electr magnets 24A, 24B and 24C. The other terminal 32 of tl battery is alternatively coupled via a conductor 34 f the other end of the electromagnets by the respecti switch 16A, 16B, and 16C when in its right hand pos tion as shown in the figure; or via a pair of contac 36 which are interrupted by a cam 38, when the respe tive switch is in its left hand position. Thus when a pa ticular switch, e.g. 16A, is in its right hand position, tl respective electromagnet 24A will be continuously ene gized and the respective pen 22A will trace a straig line. When this switch is in its left hand position, tl respective electromagnet will be intermittently energize and the respective pen will trace an oscillating line who frequency will be identical to rise on the cam 38. If mo than two visual displays are provided, then addition cam circuits will be provided, each cam having a diffe ent frequency of interruption. Thus each pen is able indicate the position of the respective switch 16.

Each of the switches 16 also controls the audio sign provided to the respective earphone 14. As shown in tl figure, when the respective switch is in its right hand p sition, the audio signal from the right hand projector 12 is being listened to by the respective viewer, and when tl respective switch is in its left hand position, the aud signal from the left hand projector is being listened t Thus the respective pen records an indication of whic of the plurality of audio displays the respective viewer listening to and, thereby, the associated visual displ which he finds most interesting.

The interest of the viewer in each of the visual di plays may be directly correlated chronologically with tl script or scenario thereof.

While there has been shown and described the pr ferred embodiment of the invention, it will be unde stood that the invention may be embodied otherwise th as herein specifically illustrated or described, and th certain changes in the form and arrangement of parts and in the specific manner of practicing the invention may be made without departing from the underlying idea or principles of the invention within this scope of the appended claims.

What is claimed is:

1. Apparatus for measuring and indicating the reaction of each of the individuals in an audience to a plurality of presentations, each presentation comprising a visual display and an associated audio display, said apparatus comprising: means for simultaneously presenting each visual display within the field of view of each of the plurality of individuals, whereby each individual at any instant of time may view any one of the visual displays while being aware of the others of the visual displays; a plurality of audio transducers, one for each respective individual, each for providing the respective individual with an audio display; a plurality of selecting means, one for each respective individual, each coupled to a respective audio transducer, for selecting any one, but only one, audio display for presentation to the respective individual and operable by such respective individual; and a plurality of indicating means, one for each respective individual, each coupled to a respective selecting means, for remotely indicating which audio display is being selected by said respective selecting means.

2. Apparatus for measuring and recording the reaction of each of the individuals in an audience to a plurality of presentations, each presentation comprising a visual display and an associated audio display, said apparatus comprising: means for simultaneously presenting each visual display within the field of view of each of the plurality of individuals, whereby each individual at any instant of time may view any one of the visual displays while being aware of the others of the visual displays; a plurality of audio transducers, one for each respective individual, each for providing the respective individual with an audio display; a plurality of selecting means, one for each respective individual, each coupled to a respective audio transducer, for selecting any one, but only one, audio display for presentation to the respective individual and operable by such respective individual; and a plurality of recording means, one for each respective individual, each coupled to a respective selecting means, for continuously recording which audio display is being selected by said respective selecting means.

3. Apparatus for measuring and indicating the reaction of each of the individuals in an audience to a plurality of presentations, each presentation comprising a visual display and an associated audio display, said apparatus comprising: a plurality of screen means disposed within the field of view of the plurality of individuals; a plurality of visual display projectors, one for each respective screen means, each simultaneously projecting a respective visual display upon the respective screen means, whereby each individual at any instant of time may view any one of the visual displays while being aware of the others of the visual displays; a plurality of audio transducers, one for each respective individual, each for providing the respective individual with an audio display; a plurality of selecting means, one for each respective individual, each coupled to a respective audio transducer, for selecting any one, but only one, audio display for presentation to the respective individual and operable by such respective individual; and a plurality of indicating means, one for each respective individual, each coupled to a respective selecting means, for remotely indicating which audio display is being selected by said respective selecting means.

4. Apparatus for measuring and recording the reaction of each of the individuals in an audience to a plurality of presentations, each presentation comprising a visual display and an associated audio display, said apparatus comprising: a plurality of screen means disposed within the field of view of the plurality of individuals; a plurality of visual display projectors, one for each respective screen means, each simultaneously projecting a respective visual display upon the respective screen means, whereby each individual at any instant of time may view any one of the visual displays while being aware of the others of the visual displays; a plurality of audio transducers, one for each respective individual, each for providing the respective individual with an audio display; a plurality of selecting means, one for each respective individual, each coupled to a respective audio transducer, for selecting any one, but only one, audio display for presentation to the respective individual and operable by such respective individual; and a plurality of recording means, one for each respective individual, each coupled to a respective selecting means, for continuously recording which audio display is being selected by said respective selecting means.

5. Apparatus for measuring and recording the reaction of each of the individuals in an audience to a plurality of presentations, each presentation comprising a visual display and an associated audio display, said apparatus comprising: a plurality of screen means disposed within the field of view of the plurality of individuals; a plurality of visual display projectors, one for each respective screen means, each simultaneously projecting a respective visual display upon the respective screen means, whereby each individual at any instant of time may view any one of the visual displays while being aware of the others of the visual displays; a plurality of audio transducers, one for each respective individual, each for providing the respective individual with an audio display; a plurality of selecting means, one for each respective individual, each coupled to a respective audio transducer, for selecting any one, but only one, audio display for presentation to the respective individual and operable by such respective individual; and a chart recorder having a plurality of recording pens, one pen for each respective individual, each pen being coupled to a respective selecting means, for continuously recording which audio display is being selected by said respective selecting means.

6. Apparatus for measuring and recording the reaction of each of the individuals in an audience to a plurality of presentations, each presentation comprising a visual display and an associated audio display, said apparatus comprising: a plurality of screen means disposed within the field of view of the plurality of individuals; a plurality of visual display projectors, one for each respective screen means, each simultaneously projecting a respective visual display upon the respective screen means, whereby each individual at any instant of time may view any one of the visual displays while being aware of the others of the visual displays; a plurality of audio transducers, one for each respective individual, each for providing the respective individual with an audio display; a plurality of selecting means, one for each respective individual, each coupled to a respective audio transducer, for selecting any one, but only one, audio display for presentation to the respective individual and operably by such respective individual; and a chart recorder having a plurality of recording pens and respective pen coding means, each pen coding means being coupled to a respective selecting means for causing the respective pen to continuously record which audio display is being selected by said respective selecting means.

7. Apparatus for measuring and indicating the reaction of each of the individuals in an audience to a plurality of presentations, each presentation comprising a visual display and an associated audio display, said apparatus comprising: a plurality of screen means disposed within the field of view of the plurality of individuals; a plurality of visual display projectors, one for each respective screen means, each simultaneously projecting a respective visual display upon the respective screen means, and also providing an audio signal associated with such visual display, whereby each individual at any instant of time may view any one of the visual displays while being aware of the others of the visual displays; a plurality of selecting means, one for each individual, each coupled to all of said projectors for selecting any one, but only one, audio signal therefrom, and operable by such respective individual; a plurality of audio transducers, one for each individual; a plurality of audio transducers, one for each individual, each coupled to a respective selecting means, for displaying the selected audio signal to the respective individual; a plurality of indicating means, one for each respective individual, each coupled to a respective selecting means, for remotely indicating which audio signal is being displayed to the respective individual.

8. Apparatus for measuring and recording the reaction of each of the individuals in an audience to a plurality of presentations, each presentation comprising a visual display and an associated audio display, said apparatus comprising: a plurality of screen means disposed within the field of view of the plurality of individuals; a plurality of visual display projectors, one for each respective screen means, each simultaneously projecting a respective visual display upon the respective screen means, and also providing an audio signal associated with such visual display, whereby each individual at any instant of time may view any one of the visual displays while being aware of the others of the visual displays; a plurality of selecting means, one for each individual, each coupled to all of said projectors for selecting any one, but only one, audio signal therefrom, and operable by such respective individual; a plurality of audio transducers, one for each individual, each coupled to a respective selecting means, for displaying the selected audio signal to the respective individual; a plurality of recording means, one for each respective individual, each coupled to a respective selecting means, for continuously recording with respect to time which audio signal is being displayed to the respective individual.

References Cited

UNITED STATES PATENTS

| 2,547,074 | 4/1951 | Cirlin | 346—7 |
| 2,924,496 | 2/1960 | Rahmel | 346—37 |
| 3,034,707 | 5/1962 | Jefferson | 235—5 |

RICHARD B. WILKINSON, *Primary Examiner.*

J. W. HARRTAY, *Assistant Examiner.*